United States Patent [19]
Graefe et al.

[11] Patent Number: 6,105,024
[45] Date of Patent: Aug. 15, 2000

[54] SYSTEM FOR MEMORY MANAGEMENT DURING RUN FORMATION FOR EXTERNAL SORTING IN DATABASE SYSTEM

[75] Inventors: Goetz Graefe, Bellevue; Per-Ake Larson, Redmond, both of Wash.

[73] Assignee: Microsoft Corporation, Redmond, Wash.

[21] Appl. No.: 09/022,575

[22] Filed: Feb. 12, 1998

[51] Int. Cl.[7] .................................................. G06F 17/00
[52] U.S. Cl. .............................. 707/7; 707/8; 707/101; 711/202; 711/212
[58] Field of Search ................ 707/1–206; 711/100–213

[56] References Cited

U.S. PATENT DOCUMENTS

| | | | |
|---|---|---|---|
| 5,490,258 | 2/1996 | Fenner | 707/1 |
| 5,546,575 | 8/1996 | Potter et al. | 707/101 |
| 5,561,793 | 10/1996 | Bennett et al. | 707/201 |
| 5,758,347 | 5/1998 | Lo et al. | 707/103 |
| 5,860,136 | 1/1999 | Fenner | 707/2 |
| 5,870,764 | 2/1999 | Lo et al. | 707/203 |

OTHER PUBLICATIONS

Vladimir Estivill–Castro and Derick Wood, A Survey of Adaptive Sorting Algorithms, ACM Computing Surveys vol. 24, No. 4, pp. 441–476 (Dec. 1992).
Goetz Graefe, Query Evaluation Techniques for Large Databases, ACM Computing Surveys, vol. 25, No. 2, pp. 73–170 (Jun. 1993).
Goetz Graefe, Sort–Merge–Join: An Idea Whose Time Has(h) Passed?, IEEE Proc. Data Engineering Conf., pp. 406–417 (1994).
Donald E. Knuth, The Art of Computer Programming: vol. 1 Fundamental Algorithms, Addison–Wesley Publishing Company, pp. 434–451 (Second Edition 1973).
Donald E. Knuth, The Art of Computer Programming: vol. 3 Sorting and Searching, Addison–Wesley Publishing Company, pp. 158–169, 250–263, 360–377 (Second Edition 1973).
Per–Ake Larson, *Grouping and Duplicate Elimination: Benefits of Early Aggregation*Manuscript submitted for publication (1997).
Vinay S. Pai and peter J. Varman, Prefetching with Multiple Disks for External Mergesort: Simulation and Analysis, IEE Proc. Data Engineering Conf., pp. 273–282 (1992).
Betty Salzberg, Merging Sorted Runs Using Large Main Memory, Acta Informatica, vol. 27, No. 3, pp.195–215 (1989).
Wilson et al., *Dynamic Storage Allocation: A Survey and Critical Review*, International Workshop on Memory Management, Kinross, Scotland, UK (1995).
LuoQuan Zheng and Per–Ake Larson, Speeding Up External Mergesort, IEEE Transactions on Knowledge and Data Engineering, vol. 8, No. 2, pp. 322–332 (1996).

*Primary Examiner*—Thomas G. Black
*Assistant Examiner*—David Yink Jung
*Attorney, Agent, or Firm*—Woodcock Washburn Kurtz Mackiewicz & Norris LLP

[57] ABSTRACT

The memory management system is operational in a database system and functions to gracefully transition data from the allocated memory space to run files on disk only as needed. The memory management system accommodates variable length input records in the workspace of a database sort operation, requires no extra copying of records in memory, and maintains memory utilization at a high level. This memory management system therefore minimizes the amount of data written to disk during run formation and enables the use of the replacement selection algorithm even with variable length input records, which improves performance of sorting and overall operational efficiency of the database system.

33 Claims, 11 Drawing Sheets

SYSTEM FOR MEMORY MANAGEMENT DURING RUN FORMATION FOR EXTERNAL SORTING IN DATABASE SYSTEM

FIELD OF THE INVENTION

This invention relates to relational database systems and the run formation phase of external merge sort. The invention comprises a memory management process designed to efficiently handle variable-length records during run formation. The system offers two main advantages over previous methods. It enables the graceful transition of in-memory sorting of input records to external sorting of the input records when the size of the set of input records exceeds the allocated workspace. It also enables the use of the efficient replacement selection algorithm for run formation in the case of variable length input records.

PROBLEM

Sorting is a fundamental operation used in many computer systems, including relational database systems, to provide sorted output, to create and maintain sorted indexes for sets of input records, and to perform set matching operations. The most frequently used sort algorithm, called external merge sort, first creates sorted partial files, called run files, on disk and then repeatedly merges them into larger runs until a single completely sorted run (the sorted output) is created.

The standard algorithm for generating the run files is termed load-sort-store and functions to fill the entire available workspace with records, sort these records using some in-memory sort algorithm, e.g. quicksort, and then write the sorted records to disk as a run file. These three steps are repeated until all input records have been processed and written to run files. If the entire input fits into the workspace, no run is created and the final output is produced directly after the first and only invocation of the in-memory sort algorithm. If the set of input records is larger than the allocated workspace, even if only slightly larger, the sort operation typically writes the entire set of input records to multiple run files on disk, and then merges the run files to produce the final sorted output. Disk accesses are relatively slow and the sudden yet complete transition from an in-memory sort to a disk based, external merge sort creates significant problems in memory management and cost estimation (as used for example in relational database systems for purposes of query optimization). The key to a solution is to write one run incrementally on disk as unsorted records for the next run are loaded into the workspace. However, if records may differ in length, management of the free space in the allocated workspace can be expensive, ineffective or both.

An alternative run formation strategy employs the replacement selection algorithm. This algorithm repeatedly selects the next record (in sort order) to be written to the run file that is currently being formed. Once the selected record is written to the run file, it is immediately replaced in memory by another record from the input. Thus, the workspace memory is always full. The record selected from among all the records stored in the workspace is the one with the lowest key, as long as that key is no lower than the key most recently written. If there is no key in the workspace higher than or equal to the one just written, a new run is begun with the lowest key in the workspace. An advantage, among the multiple advantages, of the replacement selection algorithm over the load-sort-store algorithm is that run files tend to be twice as large as the allocated workspace. Larger runs imply fewer run files, which implies less merge effort. The replacement selection algorithm replaces (inserts and deletes) individual records in the workspace, which leads to obvious problems if records are of different lengths. Since managing free space in memory can be very expensive or ineffective when records are of variable length, the replacement selection algorithm is avoided by existing sort implementations.

Thus, existing sort algorithms do not gracefully transition from in-memory sorting to external sorting. Existing sort implementations also avoid the use of the replacement selection algorithm in the case of variable length records. In both cases, the root cause is the same, namely, the lack of an efficient and effective memory management system tailored to the requirements of run formation for variable length records.

SOLUTION

The above-described problems are solved by the memory management system of the present invention. The memory management system outputs records to run files on disk only on an as-needed basis. It accommodates variable length input records efficiently and maintains memory utilization at a high level.

The application context, i.e. run formation for external sorting, both imposes restrictions and offers opportunities that can be exploited. In a sort application, the workspace is normally of fixed size and cannot be changed. However, records can be freely relocated within the workspace and records can be output to a run file at any time, albeit only in sorted order.

The memory management system of the invention, in a run formation application, performs a limited search for free space appropriate for the next input record. If a sufficiently large, contiguous free space is located, the search ends and the next input record is inserted into this space. If no such space is found, the memory management system may restructure the workspace, for example, by relocating a small number of records within the allocated workspace. When a sufficiently large, contiguous free space is created, the restructuring process ends and the next input record is inserted into this space. If the restructuring process does not create sufficient available space, the memory management system purges records from the workspace until a sufficiently large free space is created.

An essential property of the memory management system is that it retains in memory as much as possible of the input stream. If the set of input records is only slightly larger than the allocated workspace, only the excess input records are written to the disk, thereby minimizing the use of the disk. This approach enables graceful degradation of sorting. As the size of the set of input records increases, the benefits afforded by this graceful degradation decrease in proportion to the input size relative to the workspace size.

DETAILED DESCRIPTION

Figure 1:
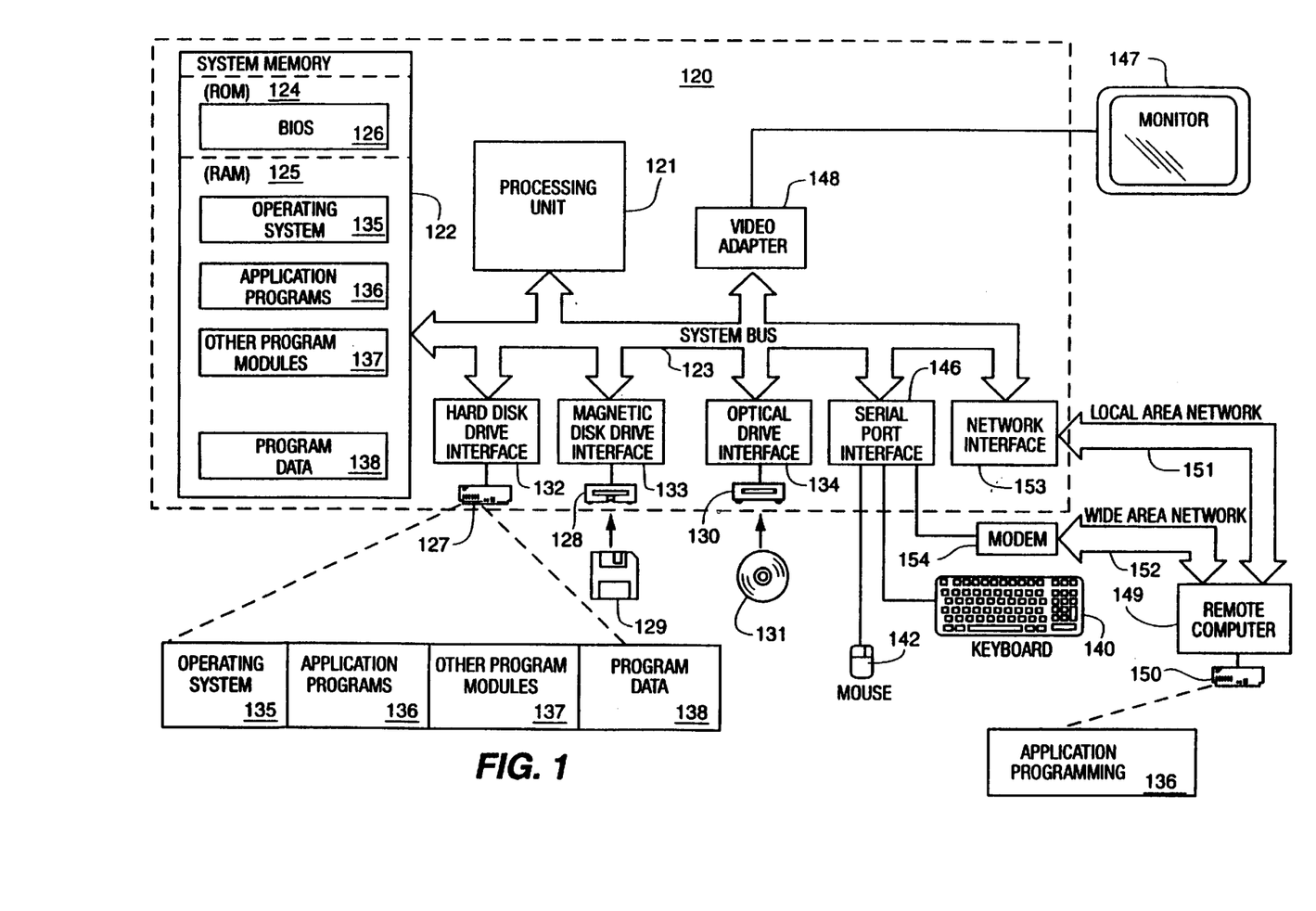
FIG. 1 illustrates in block diagram form a typical computing environment in which the present memory management system can be implemented.

FIG. 1 and the following discussion are intended to provide a brief, general description of a suitable computing environment in which the invention may be implemented. Although not required, the invention is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridge, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figure 2:
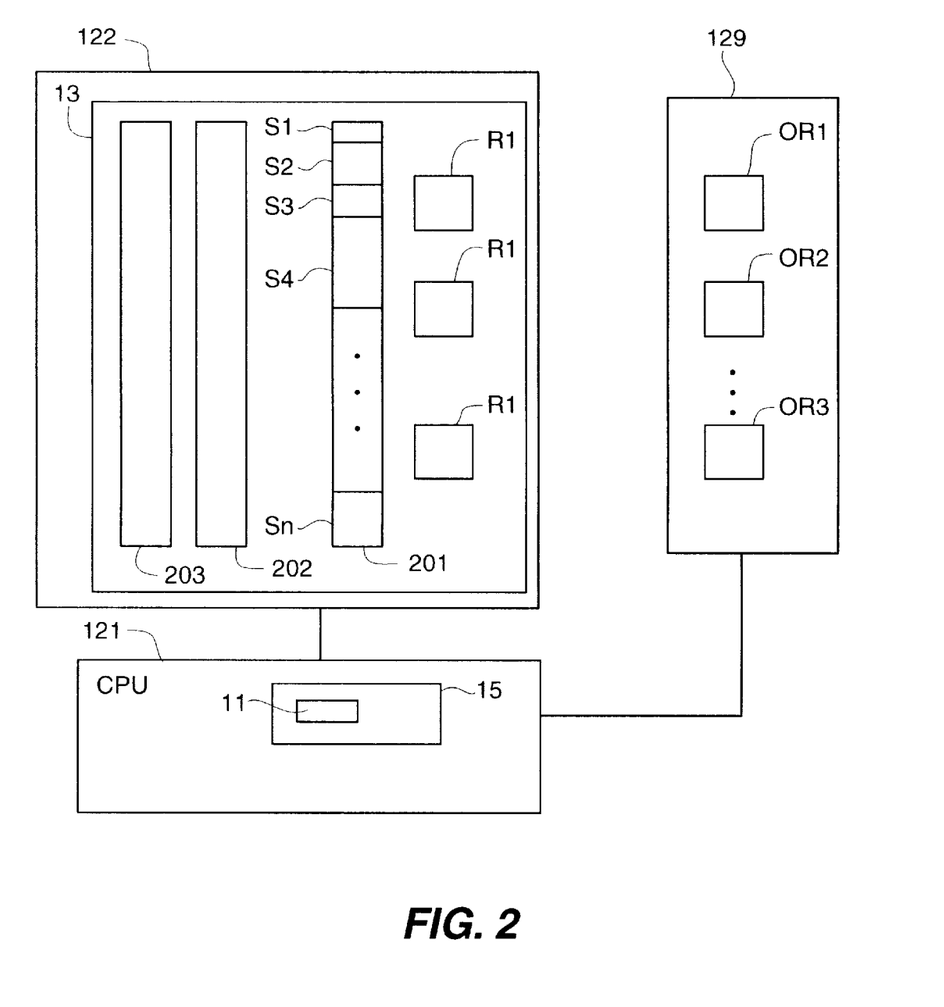
FIGS. 2A, 2B illustrate in block diagram form the workspace of the computer system of FIG. 1 and exemplary contents of the computer system memory for a typical database sort operation.
Figure 2A:
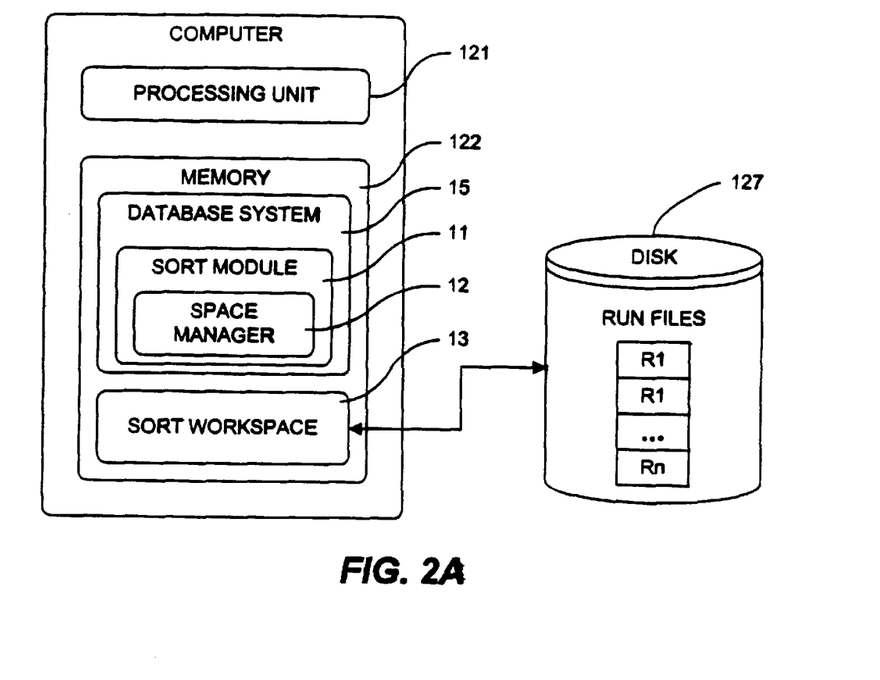
Figure 2B:
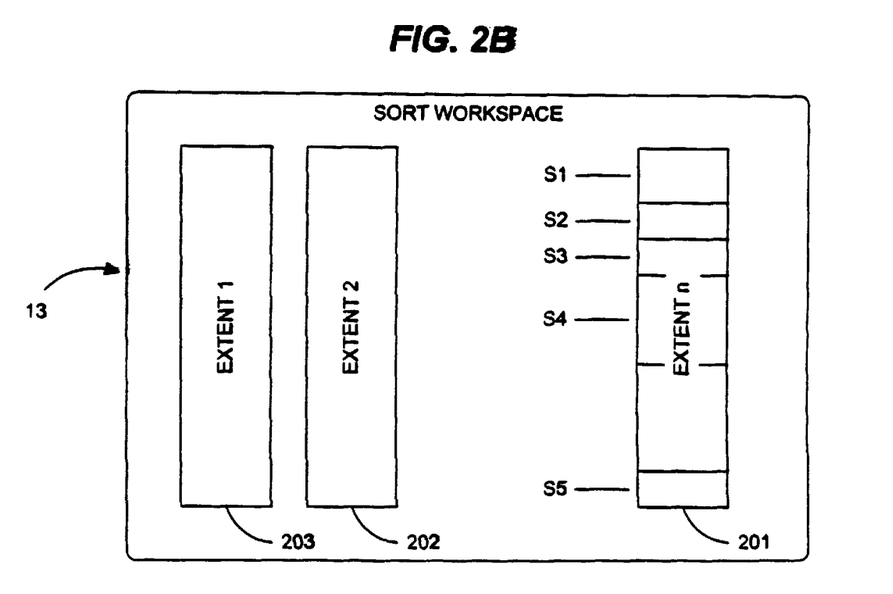

FIGS. 2A and 2B illustrate in block diagram form the workspace 13 of the computer system 120 of FIG. 1 and exemplary contents of the processor memory 122 for a typical database sort operation. In particular, the computer system 120 comprises a central processing unit (CPU) and an internal memory 122 in which the database system 15 allocates a workspace 13 for use by the sort module 11 and its sort space manager 12. A disk 127 is also included for use as an external memory by the computer system 120. Files, such as run files R1, R2, R3 are written on to available memory space on disk 127 in well-known fashion.

DATABASE SORTING OPERATIONS

Sorting is a fundamental operation that is used in many computer applications, such as in a relational database system 15. In addition to providing sorted output and enabling fast creation and maintenance of sorted indexes, the sort operation enables fundamental set matching algorithms to be efficiently implemented. Examples of such algorithms are duplicate removal, grouping (aggregation), inner and outer joins (based on merge join), semi-joins and anti-semi-joins (anti-joins), intersection, union, and set difference.

In the database system 15 illustrated in FIGS. 2A, 2B, it is assumed that input record lengths vary, since the memory management problems addressed here are trivial if all input records have the same length. Variable-length records are used extensively in all database designs—any database algorithm that fails to efficiently accommodate variable-length records is of limited practical value.

WORKSPACE MEMORY CONFIGURATION

The workspace 13, as shown in FIG. 2B, is divided into multiple extents 201–203. Each record stored therein requires contiguous space, since a record cannot be divided into multiple sub-records. An extent is a contiguous area of memory. Extent sizes may vary from a single disk page, e.g., 8 KB, to very large, e.g., multiple megabytes. An extent, such as extent 201, is typically divided into a varying number of segments S1–Sn. Each segment is of one of two types: a record segment or a free segment. Each segment, whether it holds a valid record or is currently free, starts with a data field indicating the segment type and a data field indicating the length of the segment. Free segments never abut one another—there is always at least one record segment located between adjacent free segments. A newly initialized extent, such as extent 202 or 203, contains only one free segment, which covers the entire extent. When a record is inserted into a free segment, there may be memory space left over to form a new free segment. However, if this free space is less than the minimum size of a free segment, it is included as part of the record segment.

INPUT STREAM OF RECORDS

It is presumed that the sort operation executed by the database system 15 is supplied with input records from a stream of records. This stream of input records may be the result of a simple scan or a complex query. A stream supplies input records one at a time to the sort operation and the sort operation must copy records into its workspace 13 as they are received. Moreover, the number of records in the stream of input records is typically not known to the database system 15 until the end of the stream is reached. It is also assumed that the sort operation is limited to its allocated workspace 13, i.e., it does not rely on any I/O buffers provided by the database system 15 or the operating system extant on the CPU.

RUN FORMATION BY LOAD-SORT-STORE

Most existing database systems implement some variation of the load-sort-store run formation algorithm. As outlined previously, this algorithm first fills the workspace with input records, extracts into an array pointers to all of the input records, sorts the entries in the array on the record sort key, scans forward through the array, outputting records into a run file, and finally erases all the records from the workspace. This process is repeated until all of the input records have been processed into run files. Any in-memory sorting algorithm can be used for the pointer sort operation, with the quicksort algorithm being the typical choice. All run files that are created are of the same length, except the last run which may not be completely full. If the complete input fits in the workspace, the input records are not output to disk as a run file, but are passed directly to the consuming operator.

Whenever the set of input records is larger than the allocated workspace (even by only a single input record), the load-sort-store algorithm writes the entire set of input records to the disk and the sort is completed by merging the run files. Thus, such an implementation does not provide a graceful transition from in-memory sorting to external sorting on disk in terms of processing time and I/O volume, i.e., the total amount of intermediate data written to disk during sorting.

RUN FORMATION BY REPLACEMENT SELECTION

The replacement selection algorithm is based on the observation, that by remembering the highest key value output so far to the run file being formed, it is possible to determine whether an input record can be made part of the present run file or must be delayed to a subsequent run file. The replacement selection algorithm uses a heap to efficiently find the next key in sort order and adds the run number as the first field of the sort key. The end result is a simple and very efficient algorithm for run formation that produces runs that are on average twice the size of the allocated workspace.

However, as noted previously, existing relational database systems avoid the use of the replacement selection algorithm when input records are of variable length, due to the problem of memory management of the workspace.

MEMORY MANAGEMENT SYSTEM

Figure 3:
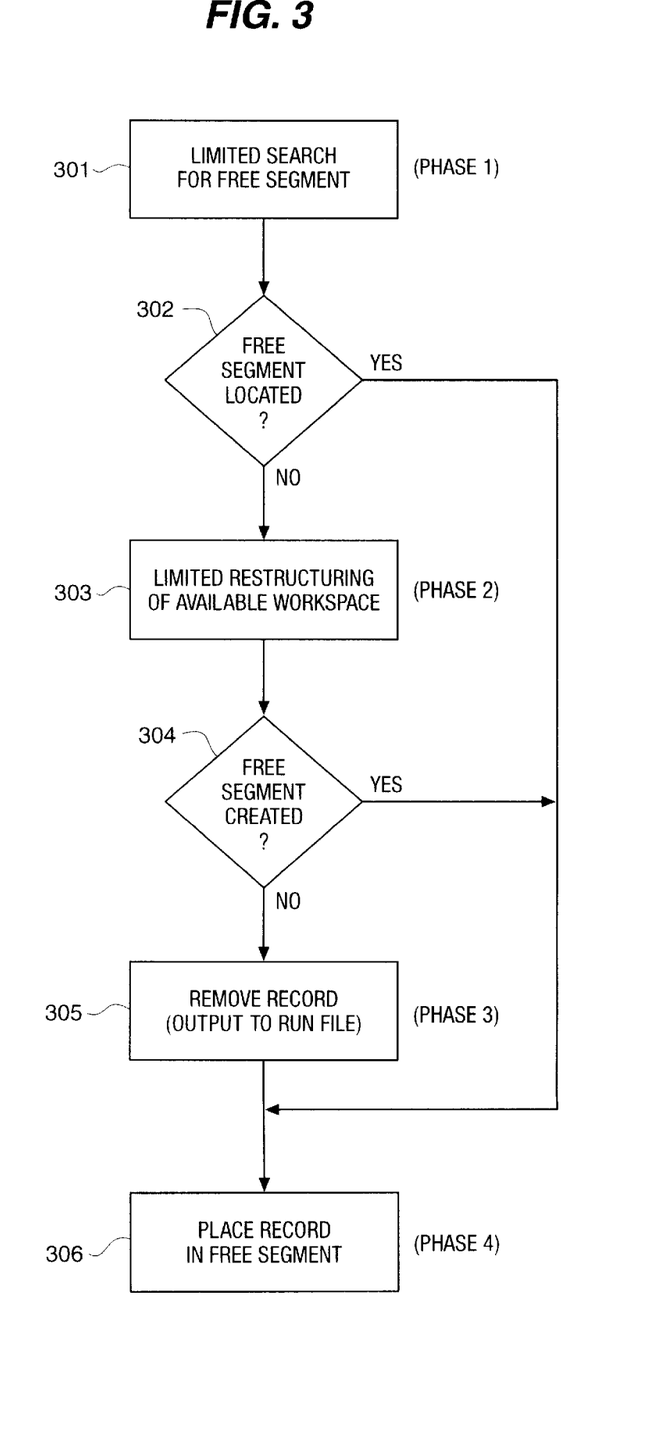
FIG. 3 illustrates in simplified flow diagram form the process for allocating memory space for variable length records according to the present invention.

The memory management system of the present invention provides an efficient method for managing memory during run formation. FIG. 3 illustrates in simplified block diagram form the process according to the present invention for allocating memory space for variable length records, also set forth in Table 1 below.

The memory management system of the present invention relies on an algorithm, shown in Table 1, designed to exploit two properties specific to the application of run formation for sorting, namely (1) records can be freely relocated within the available work space memory, and (2) records can be flushed (i.e., removed) from memory to disk at any time, albeit only in the order determined by the sort order. Further explanation on the process steps of the high-level algorithm of Table 1 will be provided in greater detail later in this description.

TABLE 1

Algorithm PlaceRecord
Input: next record from the input stream
Output: address where record placed
    /* Step 301: (limited) search for a free segment */
1.1 find a free segment;
1.2 while we have a free segment do
1.3 /* Step 302 */
    if the free segment is of acceptable size, go to 4.1;
1.4 if the number of segments checked so far
    exceeds the limit for this step, exit loop;
1.5 find another free segment (in some order);
1.6 endloop
    /* Step 303: (limited) compaction */
2.1 find a free segment;
2.2 while we have a free segment do
2.3 test whether the free segment can be enlarged to an
    acceptable size by a limited compaction, that is, by
    relocating a limited number of records to other free segments
2.4 /* Step 304 */
    if the segment can be enlarged, perform the limited
    compaction and go to 4.1;
2.5 find another free segment (in some order);
2.6 endloop
    /* Step 305: flush records */
3.1 loop until there exists a free segment of acceptable size do
3.2 flush out the next record (in sort order);
3.3 endloop TABLE 1-continued

```
/* Step 306: place record in free segment found */
4.1 place record in the beginning of the free segment found;
4.2 if the part of the free segment not occupied by the new record
    is large enough to become a free segment, split if off as
    a new free segment;
4.3 return address where record placed;
```

TABLE 1: ALGORITHM PLACERECORD

The memory management system 11 takes as input the next record (from the input stream), places it within the available workspace and returns the address where the record was placed. The search for free space proceeds in three phases. The effort spent in the first two phases can be limited. The exact limits are defined by the particular implementation. The search stops as soon as a free segment of acceptable size is found. It should be understood that the exact rules for deciding whether a free segment is of acceptable size are also defined by the particular implementation.

Referring to Table 1 in conjunction with FIG. 3, step 301 of Algorithm PlaceRecord searches through the set of free segments in some order. Step 301 terminates either when an acceptable free segment has been found at step 302 or the limit on search effort is exceeded, as defined by the parameters of the particular implementation. If step 301 locates an acceptable free segment, the algorithm proceeds to step 306 and the record is placed in the free segment. If step 301 fails to locate an acceptable free segment, as determined at step 302, the algorithm enters step 303 and attempts to enlarge an existing free segment by restructuring the available workspace 13. The segment selected to be enlarged might be one of the free segments visited during step 301. Enlarging a free segment entails moving one or more of its adjacent records to some other segment(s). If an acceptable free segment is created, as determined at step 304, the record is placed in the free segment at step 306. If step 303 fails to create an acceptable free segment, the algorithm enters step 305. During this step, records are selectively removed or flushed from the workspace 13 to disk (in sort order), continuing until a free segment of sufficient size has been created. Thereafter, in step 306, the next record from the input stream is placed in the free segment. Note that steps 305 and 303 may be interleaved, i.e. restructuring may be attempted again after a record has been flushed.

It should be appreciated that the high-level algorithm described above can be implemented in many different ways depending on the exact implementation of its steps and the exact rules for terminating a step. Further details of the system and process of the present invention are described below in connection with FIGS. 4A–4B.

GRACEFUL DEGRADATION TO EXTERNAL SORT

An essential part of the memory management system 11 is to retain in the allocated in-memory workspace 13 as much as possible of the input. In the present invention, if the set of input records is only slightly larger than the allocated workspace 13, only the excess input records are written to the disk 14, thereby minimizing the use of the disk 14. This is in contrast to the load-sort-store algorithm which writes the entire set of input records to multiple run files on disk even when the set of input records is only slightly larger than the allocated workspace. The invention achieves graceful degradation of sorting efficiency for sorting sets of input records that are slightly larger than the allocated workspace 13, since the minimal number of input records are written to disk 14. As the size of the set of input records increases, the benefits afforded by this graceful degradation decreases in proportion to the size of the input relative to the workspace size.

INSERTION POLICIES FOR MEMORY MANAGEMENT

In this section, a few example strategies to find suitable contiguous space for a new record within the workspace 13 mentioned above are described to elaborate on the above-described process.

FIRST FIT AND NEXT FIT

The simplest free segment search process is a linear scan: check the free segments in the workspace 13 one by one and stop the search process when a sufficiently large free segment is located or when all free segments in the workspace 13 have been checked. The search process can be initiated at a predetermined fixed position or at the position where the last record insertion or deletion took place. These algorithm variants are known as first fit and next fit, respectively. It should be noted that next fit requires a pointer to the first free segment to be considered in the next insertion, and that this field must be maintained when this segment is merged after one of its neighboring records has been deleted.

In one possible embodiment of the present invention, the memory management system 11 uses a variation of the first-fit or next-fit search process. Under the standard search strategy, many free segments may have to be checked to locate a suitable free segment thus requiring very high search lengths. To avoid this problem, the memory management system 11 may terminate the search after some number of free segments have been checked (limited search) to reduce the expenditure of processing resources. The exact limit is determined by the implementation.

BEST FIT

Best fit is another well-known strategy to search for a suitable free segment. This algorithm locates the smallest free segment large enough to hold the incoming record. This strategy is designed to reduce the amount of space, at the expense of potentially significantly more search effort. An exemplary implementation of the best-fit policy relies on a binary tree, using segment size as the search key in the tree. To locate a free segment with the desired property, the tree is first descended looking for an exact match. If a free segment of exactly the right size is found, the search ends. If none is found, the process attempts to locate the immediate successor of the node where the search ended. If this fails as well, none of the free segments is large enough to store the record. In the same way as discussed above, the search can be limited to checking only a limited number of free segments.

RESTRUCTURING POLICIES

If the (limited) search for free space terminates unsuccessfully, the memory management system 11 considers relocating a limited number of record segments. The purpose of this relocation operation is to enlarge an existing free segment to accommodate the received input record. This is accomplished by moving record segments located adjacent to the selected free segment, to other free segments.

If a sufficiently large free segment cannot be created using this process, the memory management system 11 proceeds to the next step and begins outputting records from the workspace. The search for free space may retain information about the free segments inspected, as well as their neighboring valid records, so as to make the restructuring step more efficient.

MEMORY MANAGEMENT SYSTEM OPERATION

Figure 4A:
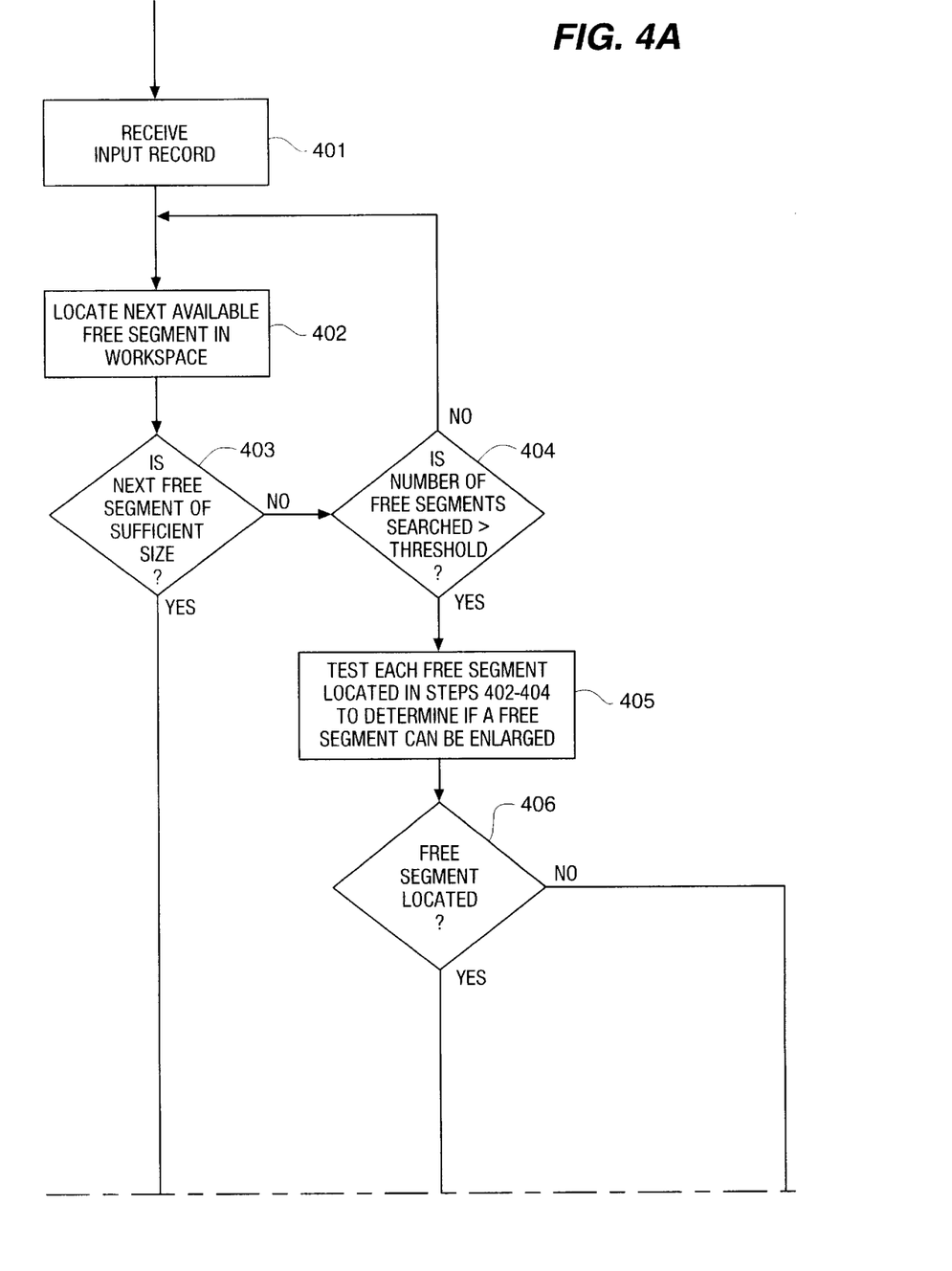
FIGS. 4A–4B illustrate in flow diagram form the operational steps taken by the present memory management system to process sets of input records, including gradual conversion from in-memory sorting to external sorting.
Figure 4B:
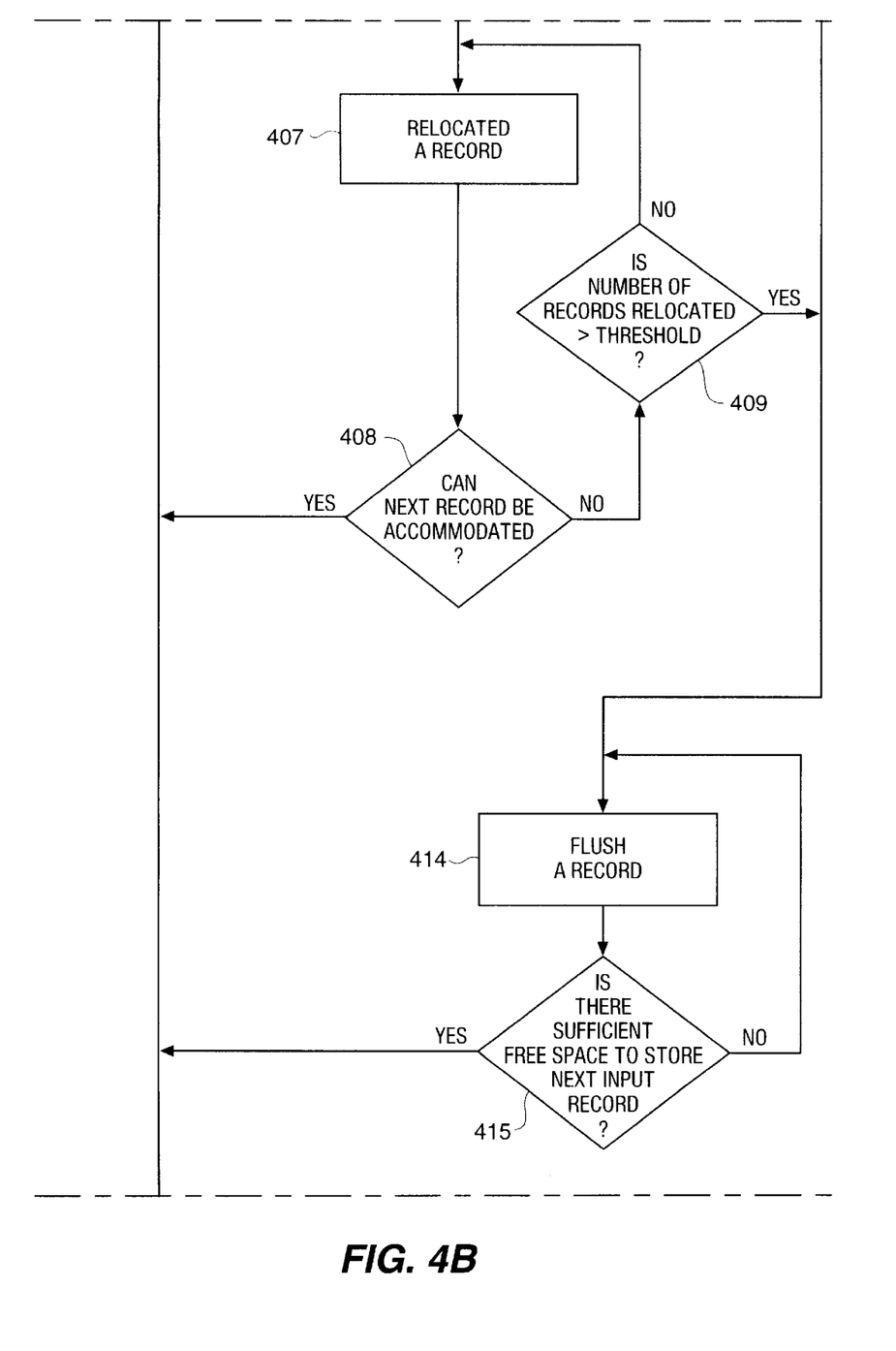
Figure 4C:
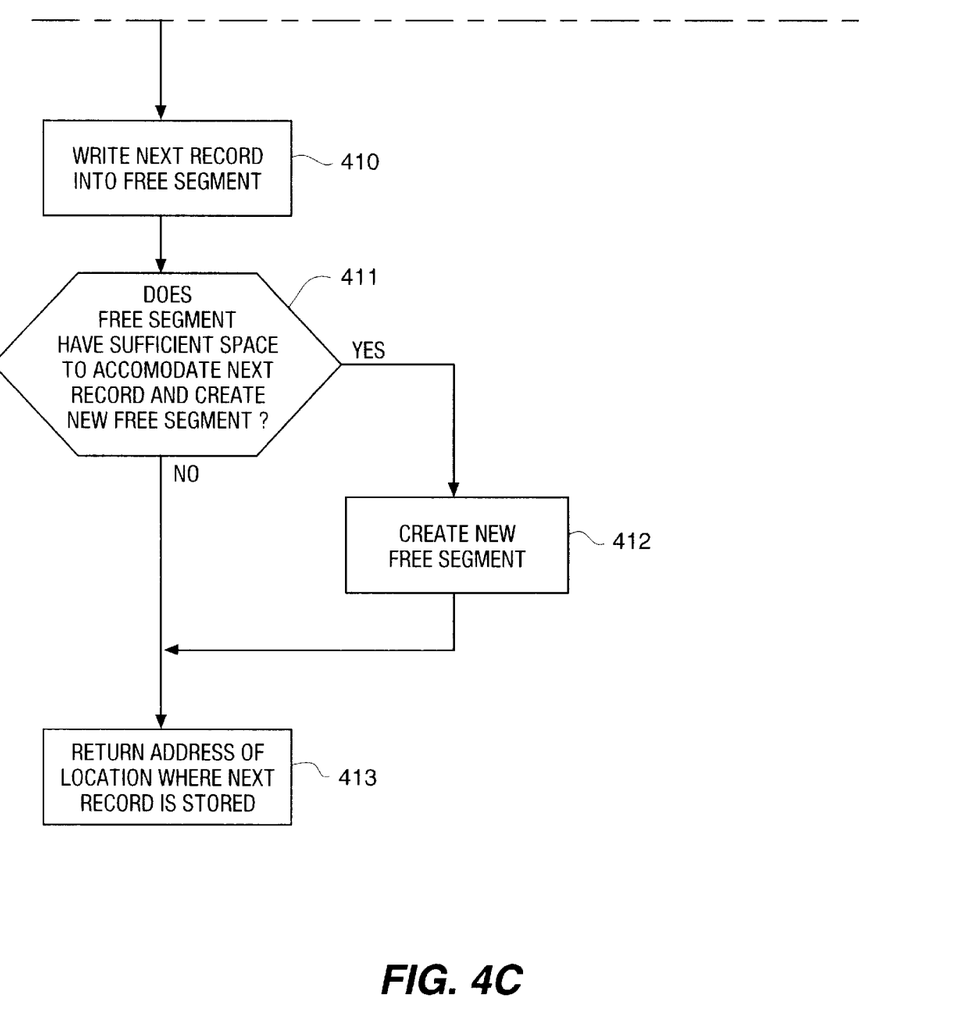

The flowchart of FIGS. 4A–4B illustrates the steps taken by the database system 15 in conjunction with the memory management system 11 to allocate memory space for variable length records, also set forth in Table 1 and described in conjunction with FIG. 3. The four phases of this operation noted in FIG. 3 are illustrated in additional detail in FIGS. 4A–4B.

The first step in this process is to receive an input record at step 401. The memory management system 11 then conducts a limited search of the workspace (Phase 1) to locate a free segment of sufficient size to receive the next input record. This is accomplished by locating, in step 402, the next free segment (in some order) in the workspace and determining, in step 403, whether this free segment is of sufficient size to receive the input record. If the free segment is acceptable, processing advances to step 410 where this next record is stored in this identified free segment (Phase 4). If the free segment is not acceptable, at step 404 the memory management system 11 determines whether the number of free segments searched exceeds a predetermined number (or some other implementation-defined termination condition is satisfied. If this threshold is not exceeded, processing advances to step 402 where another free segment is located. If the search threshold is exceeded at step 404, the memory management system 11 performs a limited restructuring of the available workspace to create the necessary free space for the received input record rather than searching further in the workspace for an acceptable free segment.

Since the records can be moved within the workspace 13, the memory management system 11 can move one or more selected records to make a free segment larger, hopefully large enough to accept the input record. Therefore, if the search threshold is exceeded at step 404, the memory management system 11 begins the restructuring process (Phase 2) at step 405 wherein the memory management system 11 determines whether a free segment can be enlarged by relocating a limited number of records stored in successive adjacent record segments to other free segments. If at step 406 it is determined that one of the free segments considered during this phase can be sufficiently enlarged, processing advances to step 407. If none of the free segments considered can be enlarged, processing proceeds to step 414. Alternatively, restructuring can be re-attempted. At step 407, one or more records are moved to other free space to enlarge the identified free segment to accept the input record. The memory management system 11 then advances to step 410 where the input record is stored in this enlarged free segment (Phase 4).

If, at step 406, it is determined that none of the free segments can be adequately enlarged, processing advances to step 414 where records are flushed from the workspace memory to a run file (Phase 3). This process comprises flushing a record from the workspace memory to a run file at step 414, then checking the resultant free segment to determine at step 415 whether the next input record can now be accommodated in this free segment. If the identified free segment is sufficiently large to accept the input record, the memory management system 11 advances to step 410 where this next input record is stored in this free segment (Phase 4). If the resultant free segment cannot accept the input record, processing returns to step 414 where another record is flushed from the workspace 13 to a run file. This process continues until sufficient free space is created to accept the next input record.

The memory management system 11 at step 410 stores the next input record in the selected free segment. This is accomplished by copying the input record in the free segment at step 410 and determining at step 411 whether the part of the free segment not occupied by the next input record is of sufficient size to become another free segment. If so, at step 412, this remaining free space is split off as a new free segment and at step 413 the memory management system 11 returns the address where the input record has been stored in workspace memory 13. Step 413 is also executed where the memory management system 11 determines at step 411 that the part of the free segment not occupied by the next input record is not of sufficient size to become another free segment.

It will be appreciated by those skilled in the art that alternative replacement strategies can be employed with the memory management system of the present invention. For example, the memory management system 11 can use a next fit or best fit space allocation process, where the search for a suitable free segment is restarted from the site from which the last record was output from the workspace 13. Performance results when using best fit and next fit with single record move are described below in connection with FIGS. 5–13.

LAST-RUN OPTIMIZATION

When no more input records are found in the input, the created run files must be merged to create a single run file that contains the desired ordering of the input records. The merging of the run files is typically done in an K-way merge so that the ordered record segments that are contained in each of the K run files are interleaved into a single ordering in a single merged file. To optimize the efficiency of this merge operation for a merge fan-in of K, the sort module 11 adds dummy runs of length zero to the set of runs to make the number of run files less one divisible by K−1. The soft module 11 then merges together the K shortest runs and repeats this process, using the K remaining shortest runs until only a single run remains. (Alternative merge patterns are possible.) To reduce the amount of data written to disk, the last two run files are included in the first merge step, regardless of their size. When the end of the input record stream is encountered, the final (short) run file remains in the workspace as well as the tail of the previous run file. Including them in the first merge step avoids having to write them to disk, which improves overall processing speed.

EXPERIMENTAL ANALYSIS OF SPACE MANAGEMENT

A prototype of the above described memory management system was built and used for experiments on randomly generated input data. This section describes the results measured during these experiments. The description of the experimental results is divided into four parts. The first two subsections concentrate on space utilization and cost of locating or creating a suitable free segment for an incoming record. The third subsection reports on the average run lengths achieved by replacement selection when space is managed by best fit. The fourth section focuses on the reduction in the amount of data written to and read from disk during sorting.

Records, in particular, their key values and lengths were generated randomly as input for the experiments. Key values were drawn from a uniform distribution. Record lengths were drawn from a triangular distribution with a specified minimum and maximum length. (The density function is a linear function with its highest value at the minimum record length and a density of 0 at the maximum.) Thus, the average record length is the minimum plus one third of the difference of maximum and minimum.

BEST FIT: SPACE UTILIZATION AND SEARCH EFFORT

Figure 5:
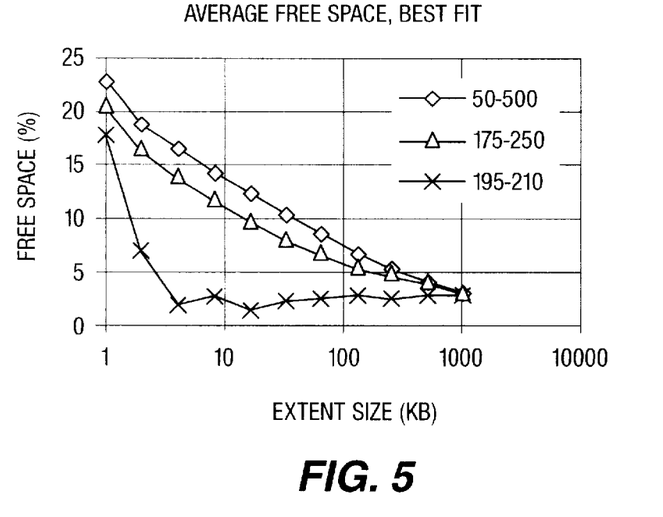
FIGS. 5–13 illustrate experimental results for the operation of the memory management system.
Figure 6:
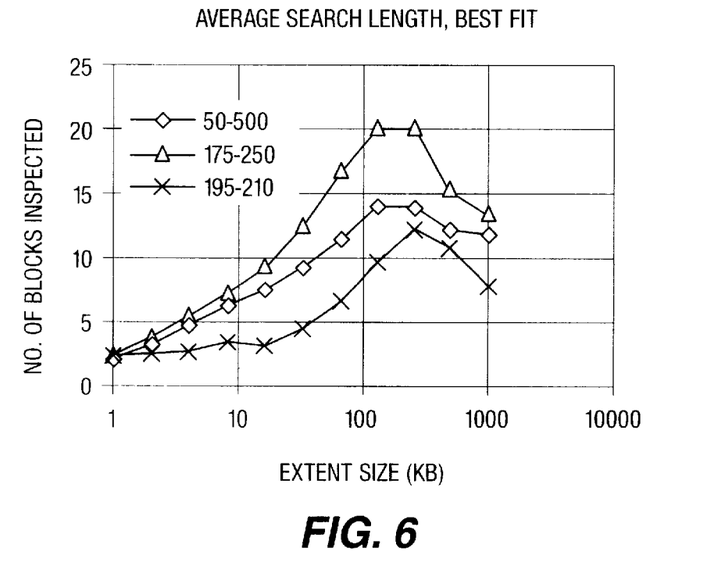

This section is illustrated by the graphs of FIGS. 5–6. FIG. 5 shows the space utilization for a variety of record and extent sizes, presuming space is managed by best fit. Space utilization is the percentage of bytes in the workspace occupied by actual record data. Each line represents a range of record lengths (in bytes), and is labeled with minimum and maximum record length.

FIG. 5 immediately lends itself to several observations. First, the larger the extents, the higher the space utilization. This agrees with intuition: the more records and gaps there are on a page, the better can the best fit heuristic insert new records into existing free segments. Second, for record collections of almost uniform length (195–210), little space is lost to fragmentation. Third, even when extents are very small, 5 times the average record size or 1 KB, the space utilization is still as high as 75%. For workspace size more reasonable as a sort operations workspace, such as 256 KB or 1,280 average record lengths, the space utilization is over 90%. Nonetheless, if a sort operation workspace 13 is divided into too many extents of too small a size, low space utilization may become a problem. Fourth, there is no significant difference in space utilization for record collections with moderately and drastically varying record lengths. The overall conclusion one can draw from the data presented in FIG. 5 is clear: except in unrealistic circumstances, the best fit insertion policy succeeds in reclaiming free space remarkably well.

FIG. 6 illustrates the search effort required to locate a free segment. The implementation of best fit used for the experiments relies on a binary tree of free segments and the search effort roughly corresponds to the depth of the tree. Note that no effort was made to keep the tree balanced, and a suitable free segment may be found in the tree without searching all the way to the tree's leaf nodes. Intuitively, one would expect the search length to increase steadily with the extent size, but this is not the case. Regardless of the variance in record length, it reaches a maximum somewhere in the range of 128 KB to 256 KB. The main reason for the decrease is that the number of free blocks increases as the extent size increases and a larger fraction of the requests find a free block of exactly the right size. Searches that find an exact match finish higher up in the tree.

NEXT FIT: SPACE UTILIZATION AND SEARCH EFFORT

Figure 7:
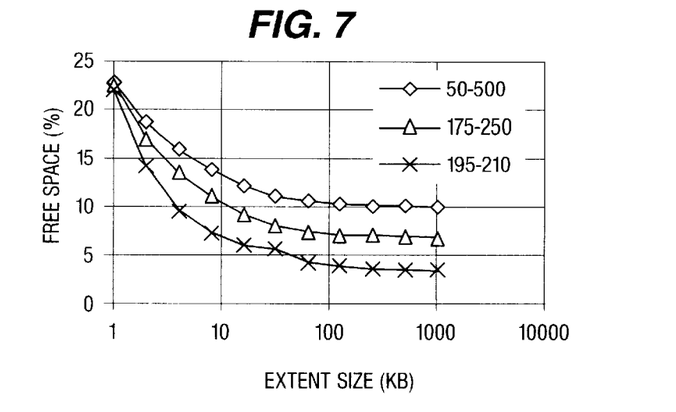
Figure 8:
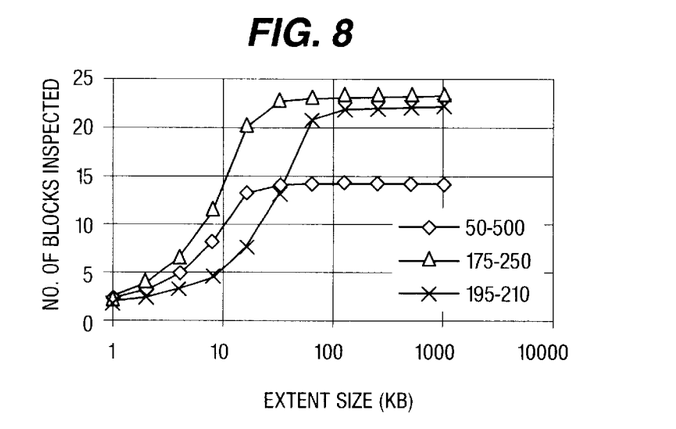
Figure 9:
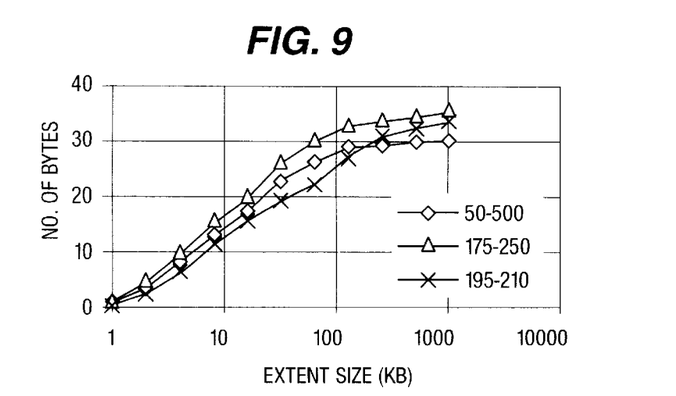

FIGS. 7–9 summarize the performance of next fit with single record move, i.e. restructuring was limited to moving a single record. In these experiments, the search limit was set to 25. The average space utilization (FIG. 7) increases smoothly as the extent size increases. However, it is always lower than the space utilization for best-fit, except for extents of size 8 KB to 16 KB. The average search length is plotted in FIG. 8. Again, the average search lengths are very reasonable but slightly higher than those for best-fit. The algorithm occasionally moves a record to enlarge a free block as described above with reference to FIGS. 4A and 4B. FIG. 9 shows the average number of bytes moved per record inserted. When the extent size is 1 MB, slightly over 30 bytes (about 116 of the average record length) are moved. This is surprisingly low. About ¼ of the insertions cause a record to be moved. The records moved tend to be shorter than the average record length, which explains the discrepancy. Based on the experiments, it is evident that best-fit is the preferred choice, at least for memory management during run formation. However, the next-fit algorithm uses a simpler data structure (linked list). This may be a consideration in other applications or circumstances, for example, when managing space shared by multiple threads running in parallel.

RUN LENGTH

Figure 10:
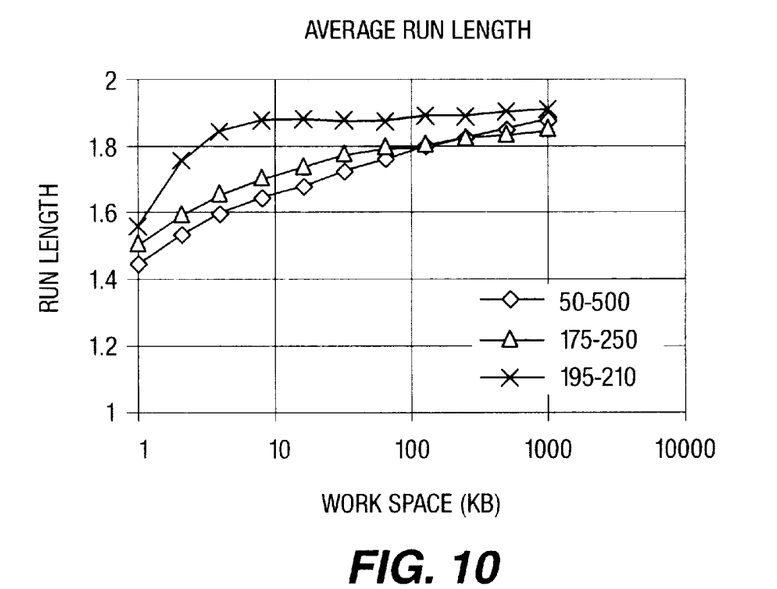

This section reports on the generation of initial runs by replacement selection when space is managed by best fit. The results are reported in terms of relative run length, which is the run length in bytes divided by the workspace size in bytes. FIG. 10 plots the average run length for three different record length distributions and workspace sizes. As expected, the relative run length increases as the workspace size increases and as the variance in record length decreases. Both have the effect of increasing memory utilization, which immediately translates into longer runs. Overall, the relative run lengths are remarkably high: when the workspace is 128 KB or higher, run lengths reach 1.8, which is within 10% of the results attained for fixed length records.

TOTAL I/O VOLUME

Figure 11:
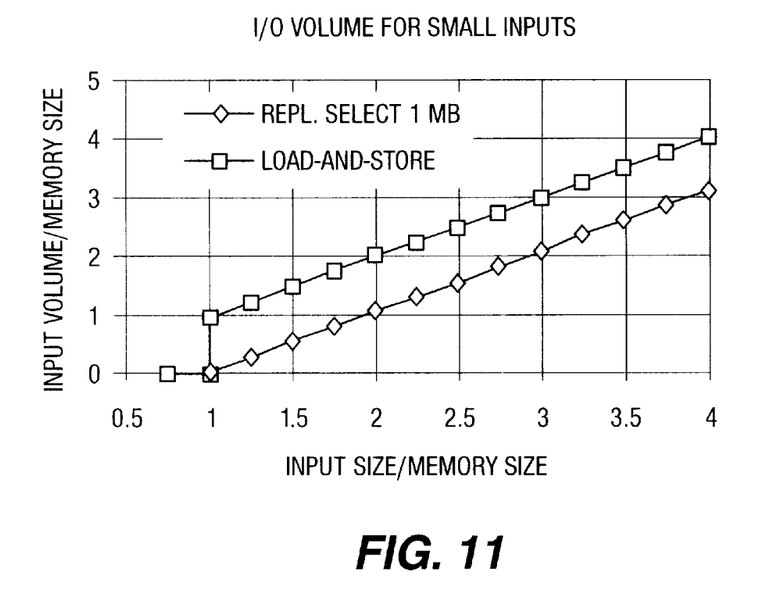
Figure 12:
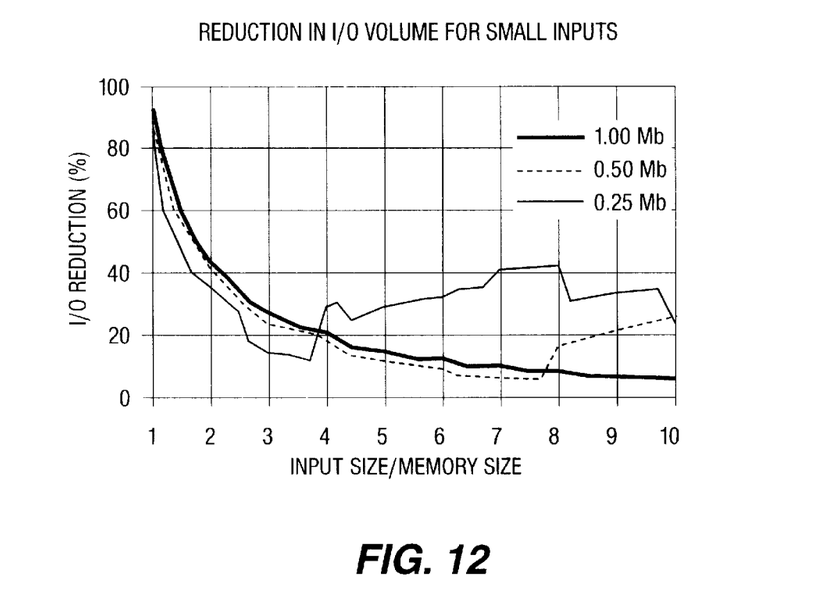
Figure 13:
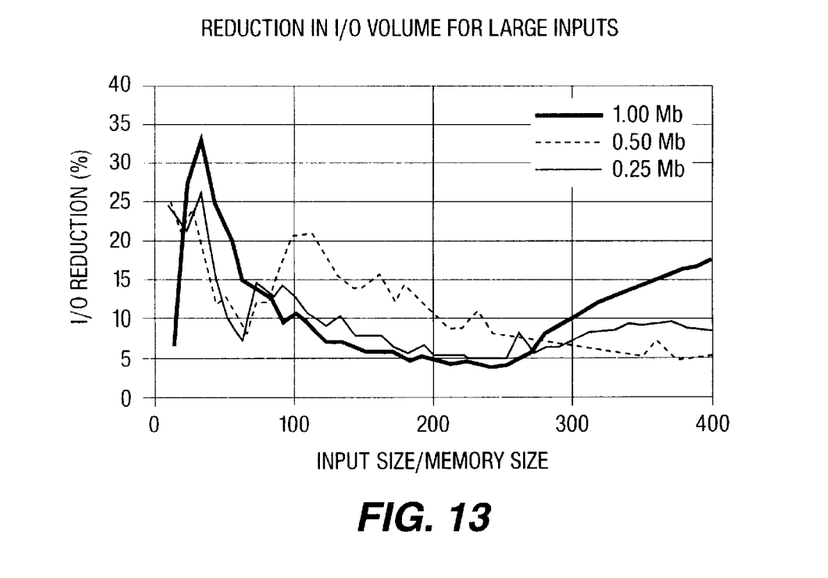

FIGS. 11–13 illustrate this section, where the experimental results compare the amount of intermediate data (runs) that are written to disk using two different run formation algorithms: replacement selection with best fit and load-sort-store. The term I/O volume denotes the total amount of intermediate data written to disk during sorting. The initial runs are included in this figure, but not the final output. These results are based upon a buffer size of 64 KB with a single buffer per run. The buffer size, the number of buffers per run, and the total amount of memory determine the maximum merge fan-in: 1.00 Mb of memory is sufficient for a 16-way merge, 0.5 Mb for an 8-way merge and 0.25 Mb for a 4-way merge.

FIG. 11 illustrates the smooth increase in I/O volume achieved by using the new memory management system and applying the last-run optimization. The system completely avoids the sudden increase in I/O volume experienced by the traditional load-sort-store algorithm when the input size exceeds the workspace size. FIGS. 12 and 13 illustrate the reduction in I/O volume achieved by using the replacement selection algorithm (with best fit) compared to the I/O volume for the traditional load-sort-store algorithm. In these experiments, the record length varied between 100 and 400 bytes. FIG. 12 illustrates the reduction in I/O volume for small inputs, such as less than 10 times the workspace. When the set of input records is only slightly larger than the workspace, almost all of the records are retained in the workspace, resulting in a reduction of I/O volume by almost 100%. The reduction is still about 20% for inputs as large as four times the memory size. The jumps at four and eight times memory size should be noted. They occur where the standard implementation shifts from a single merge step to two merge steps. Because replacement selection produces fewer runs, it can still complete the sort with a single merge.

FIG. 13 illustrates the reduction in I/O volume for large inputs, which results from having fewer runs and therefore fewer merge steps. The most significant impact occurs when the standard sort process adds one more merge step to the initial process. The increase beginning at a relative input size of 256 results from the 16-way fan-in, since 256 runs can be merged by two successive merge passes. Any input larger than 256 require three merge passes when using the load-sort-store process, while replacement selection produces longer runs, thereby avoiding the overhead of the third merge step for a significant number of runs.

SUMMARY

As is evident from the foregoing description, the system of the present invention manages space both efficiently and effectively during the run generation phase of external sorting when records are of variable length. This enables the use of the replacement selection algorithm for run generation even when input records are of variable length. In addition, the invention provides graceful transition from complete in-memory sorting to full external sorting since only the minimum number of records necessary to free up in-memory workspace are written to disk during run formation.

We claim:

1. A method of managing a workspace of predetermined fixed extent containing a plurality of variable length records to enable the writing of additional variable length records into said workspace, comprising the steps of:

performing a limited search for free space in said workspace that is suitable for a next variable length record;

selectively restructuring the available space in said workspace to create suitable free space for said next variable length record if the limited search does not locate a suitable free space for said next variable length record; and removing some number of records from said workspace to create suitable free space for said next variable length record if the selective restructuring does not create a suitable free space for said next variable length record.

2. The method of claim 1, wherein said number of records comprises a plurality.

3. The method of claim 1 wherein the step of selectively restructuring comprises:

moving at least one variable length record to another location within said workspace to create suitable free space for said next variable length record.

4. The method of claim 3 wherein said workspace contains record segments and free segments, said step of moving comprises:

selecting, in response to none of said free segments being of extent sufficient to store said next variable length record, a one of said free segments; and relocating a one of said record segments that is juxtaposed to the selected free segment to enlarge the selected free segment.

5. The method of claim 4 wherein said step of moving further comprises:

relocating a second one of said record segments that is juxtaposed to the enlarged free segment to create a free segment of extent sufficient to store said next variable length record.

6. The method of claim 1 wherein said workspace contains record segments and free segments, said step of performing a limited search comprises:

locating a free segment in said workspace memory using a best fit paradigm to match said next variable length record with a free segment that most closely matches the size of said next variable length record.

7. The method of claim 6 wherein said step of performing a limited search further comprises:

terminating, according to a termination condition, the search for a free segment prior to having checked all of the free segments in said workspace.

8. The method of claim 7, wherein said termination condition comprises a limit as to the number of free segments to be tested.

9. The method of claim 1 wherein said workspace contains record segments and free segments, said step of performing a limited search comprises:

locating a free segment in said workspace memory using a next fit paradigm to match said next variable length record with a next available free segment that can accept said next variable length record.

10. The method of claim 9 wherein said step of performing a limited search further comprises:

terminating, according to a termination condition, the search for a free segment prior to having checked all of the free segments in said workspace.

11. The method of claim 10, wherein said termination condition comprises a limit as to the number of free segments to be tested.

12. A method of managing a workspace of predetermined fixed extent to create free space therein to enable the writing of variable length records into said workspace, comprising the steps of:

populating said workspace with a plurality of variable length records obtained from a set of variable length records, until said workspace is substantially filled;

receiving a next one of said set of variable length records; and selectively removing at least one of said plurality of variable length records from said workspace to create free space to accommodate said next one of said set of variable length records.

13. The method of claim 12 wherein said workspace contains record segments and free segments, wherein said step of populating comprises:

receiving a first variable length record from said set of variable length records;

scanning a number of said free segments to locate a free segment of sufficient size to store said first variable length record; and inserting said first variable length record into the located free segment.

14. The method of claim 13 further comprising:

restructuring the available space in the workspace to create a free segment of sufficient size for said first variable length record if the step of scanning does not locate a free segment of sufficient size to store said variable length record.

15. The method of claim 14 wherein said step of restructuring comprises:

selecting a one of said free segments; and relocating a first record segment that is juxtaposed to the selected free segment to enlarge the size of the selected free segment.

16. The method of claim 15 wherein said step of restructuring further comprises:

relocating a second segment that is juxtaposed to the enlarged free segment to create a free segment of sufficient size to store said first variable length record.

17. The method of claim 13 wherein said step of scanning terminates, according to a termination condition, before all free segments in said workspace have been scanned.

18. The method of claim 12, wherein said termination condition comprises a limit as to the number of free segments to be scanned.

19. The method of claim 17 wherein the locating of a free segment in said scanning step is performed according to a paradigm selected from the class of space search paradigms consisting of: best fit, first fit, and next fit.

20. The method of claim 12 wherein said workspace is used by a database system to create a plurality of run files, each of which contains a plurality of variable length records from said set of variable length records, as sorted by said database system using said workspace, said step of selectively removing comprises writing a next of the plurality of variable length records that are stored in said workspace out to a run file in a predetermined order, said method further comprising:

determining that said set of variable length records is greater in size than said predetermined fixed extent of said workspace;

creating one or more run files on a data storage medium; and writing out to said run files only those variable length record selected by said step of selectively removing subsequent to determining that said set of variable length records is greater in size than said predetermined fixed extent of said workspace.

21. The method of claim 20 further comprising the step of:

creating an additional run file on said data storage medium in response to said sorted variable length records stored in said workspace having no entries that can be placed in said predetermined order into any of said run files.

22. The method of claim 21 further comprising the step of:

merging the K smallest of said plurality of run files in an K-way fan-in merge process, with two of said K smallest run files being the last created run file and any residual record segments stored in said workspace.

23. A computer-readable medium having computer-executable instructions for performing steps comprising:

populating a workspace with a plurality of variable length records obtained from a set of variable length records, until said workspace is substantially filled;

receiving a next one of said set of variable length records; and selectively removing at least one of said plurality of variable length records from said workspace to create free space in said workspace to accommodate said next one of said set of variable length records.

24. The computer-readable medium of claim 22 wherein said workspace contains record segments and free segments, said step of populating comprising:

receiving a first variable length record from said set of variable length records;

scanning a number of said free segments to locate a free segment of sufficient size to store said first variable length record; and inserting said first variable length record into the located free segment.

25. The computer-readable medium of claim 24, further comprising:

restructuring the available space in the workspace to create a free segment of sufficient size for said first variable length record if the step of scanning does not locate a free segment of sufficient size to store said variable length record.

26. The computer-readable medium of claim 25 wherein said step of restructuring comprises:

selecting a one of said free segments; and relocating a first record segment that is juxtaposed to the selected free segment to enlarge the size of the selected free segment.

27. The computer-readable medium of claim 26 wherein said step of restructuring further comprises:

relocating a second segment that is juxtaposed to the enlarged free segment to create a free segment of sufficient size to store said first variable length record.

28. The computer-readable medium of claim 24 wherein said step of scanning terminates, according to a termination condition, before all free segments in said workspace have been scanned.

29. The method of claim 28, wherein said termination condition comprises a limit as to the number of free segments to be scanned.

30. The computer-readable medium of claim 28 wherein the locating of a free segment in said scanning step is performed according to a paradigm selected from the class of record insertion paradigms consisting of: best fit, first fit, and next fit.

31. The computer-readable medium of claim 23 wherein said workspace is used by a database system to create a plurality of run files, each of which contains a plurality of variable length records from said set of variable length records, as sorted by said database system using said workspace, said step of selectively removing comprises writing a next of the plurality of variable length records that are stored in said workspace out to a run file in a predetermined order, said method further having computer-executable instructions for performing steps comprising:

determining that said set of variable length records is greater in size than said predetermined fixed extent of said workspace;

creating one or more run files on a data storage medium; and writing out to said run file only those variable length record selected by said step of selectively removing subsequent to determining that said set of variable length records is greater in size than said predetermined fixed extent of said workspace.

32. The computer-readable medium of claim 31 having computer-executable instructions for performing steps comprising:

creating an additional run file on said data storage medium in response to said sorted variable length records stored in said workspace having no entries that can be placed in said predetermined order into any of said run files.

33. The computer-readable medium of claim 32 having computer-executable instructions for performing steps comprising:

merging the K smallest of said plurality of run files in an K-way fan-in merge process, with two of said K smallest run files being the last created run file and any residual record segments stored in said workspace.

* * * * *